US009877071B1

(12) United States Patent
Sharifi et al.

(10) Patent No.: US 9,877,071 B1
(45) **Date of Patent: *Jan. 23, 2018**

(54) DETECTION OF CREATIVE WORKS ON BROADCAST MEDIA

(71) Applicant: Google Inc., Mountain View, CA (US)

(72) Inventors: Matthew Sharifi, Zurich (CH); Ant Oztaskent, Surrey (GB); Yaroslav Volovich, Cambridge (GB)

(73) Assignee: GOOGLE INC., Mountain View, CA (US)

( * ) Notice: Subject to any disclaimer, the term of this patent is extended or adjusted under 35 U.S.C. 154(b) by 931 days.

This patent is subject to a terminal disclaimer.

(21) Appl. No.: 13/873,821

(22) Filed: Apr. 30, 2013

Related U.S. Application Data

(63) Continuation of application No. 13/246,558, filed on Sep. 27, 2011, now Pat. No. 8,433,577.

(51) Int. Cl.

*G10L 21/00* (2013.01)
*G10L 25/51* (2013.01)
*G10L 25/54* (2013.01)
*G10L 25/57* (2013.01)
*G10L 25/81* (2013.01)
*H04N 21/442* (2011.01)

(52) U.S. Cl.

CPC ........... *H04N 21/442* (2013.01); *G10L 25/51* (2013.01); *G10L 25/54* (2013.01); *G10L 25/57* (2013.01); *G10L 25/81* (2013.01)

(58) Field of Classification Search

CPC ......... G10L 25/51; G10L 21/54; G10L 21/57; G10L 21/60; G10L 21/81; G06F 17/3074; G06F 17/30743

USPC ..................... 704/231, 270; 707/913; 705/58

See application file for complete search history.

(56) References Cited

U.S. PATENT DOCUMENTS 6,636,238 B1 10/2003 Amir et al.
6,714,909 B1 3/2004 Gibbon et al.
6,892,193 B2 5/2005 Bolle et al.
6,990,453 B2 1/2006 Wang et al.
7,058,376 B2 6/2006 Logan et al.
7,221,902 B2 5/2007 Kopra et al.
7,424,427 B2 9/2008 Liu et al.
7,548,565 B2 6/2009 Sull et al.
7,801,910 B2 9/2010 Houh et al.
7,853,664 B1 12/2010 Wang et al.
8,036,897 B2 10/2011 Smolenski et al.
8,805,683 B1 * 8/2014 Wiseman ................ G10L 15/22 379/88.01

(Continued)

OTHER PUBLICATIONS

Global File Registry. "Global File Registry—Technical White Paper," Draft 1, May 26, 2006, published online at [http://www.globalfileregistry.com/assets/Global_File_Registry_White_Paper.pdf], retrieved Mar. 15, 2012, 20 pages.

(Continued)

*Primary Examiner* — James Wozniak
(74) *Attorney, Agent, or Firm* — Young Basile Hanlon & MacFarlane, P.C.

(57) ABSTRACT

This disclosure relates to systems and methods for proactively determining identification information for a plurality of audio segments within a plurality of broadcast media streams, and providing identification information associated with specific audio portions of a broadcast media stream automatically or upon request.

11 Claims, 13 Drawing Sheets

100
150
CHANNEL 1
CHANNEL 2
CHANNEL 3
...
CHANNEL N
130
BROADCAST MEDIA RECEPTION COMPONENT
140
120
LIBRARY
IDENTIFICATION COMPONENT
170
CLIENT INTERFACE COMPONENT
AUDIO IDENTIFICATION SERVER
110
160
CLIENT DEVICE
160
CLIENT DEVICE

(56) References Cited

U.S. PATENT DOCUMENTS

| | | | | |
|---|---|---|---|---|
| 2002/0087565 | A1* | 7/2002 | Hoekman | G06F 17/30038 |
| 2002/0124263 | A1 | 9/2002 | Yokomizo | |
| 2003/0061490 | A1 | 3/2003 | Abajian | |
| 2003/0093790 | A1 | 5/2003 | Logan et al. | |
| 2003/0163823 | A1 | 8/2003 | Logan et al. | |
| 2004/0006628 | A1 | 1/2004 | Shepard et al. | |
| 2004/0128514 | A1* | 7/2004 | Rhoads | G06F 17/30017 713/176 |
| 2004/0230432 | A1 | 11/2004 | Liu et al. | |
| 2005/0038819 | A1* | 2/2005 | Hicken | G06F 17/30743 |
| 2005/0267750 | A1 | 12/2005 | Steuer et al. | |
| 2006/0092282 | A1* | 5/2006 | Herley | H04H 20/10 348/207.99 |
| 2006/0242554 | A1* | 10/2006 | Gerace | G06F 17/30867 715/209 |
| 2006/0262887 | A1* | 11/2006 | Lombardo | G10L 25/48 375/350 |
| 2007/0106721 | A1 | 5/2007 | Schloter | |
| 2007/0208561 | A1 | 9/2007 | Choi et al. | |
| 2008/0049704 | A1 | 2/2008 | Witteman et al. | |
| 2008/0066098 | A1 | 3/2008 | Witteman et al. | |
| 2009/0292819 | A1 | 11/2009 | Kandekar et al. | |
| 2010/0030775 | A1* | 2/2010 | Mohajer | G06F 17/30743 704/243 |
| 2010/0169358 | A1 | 7/2010 | Zhang | |
| 2010/0205174 | A1 | 8/2010 | Jiang et al. | |
| 2011/0078020 | A1* | 3/2011 | LaJoie | G06F 17/30743 705/14.53 |
| 2011/0078172 | A1* | 3/2011 | LaJoie | G06F 17/30775 707/769 |
| 2011/0078729 | A1* | 3/2011 | LaJoie | G11B 27/28 725/36 |
| 2011/0208524 | A1* | 8/2011 | Haughay | G10L 15/22 704/246 |
| 2011/0213812 | A1* | 9/2011 | De Nijs | G06F 17/30858 707/822 |
| 2011/0246937 | A1 | 10/2011 | Roberts et al. | |
| 2011/0276333 | A1* | 11/2011 | Wang | G06F 17/30861 704/270 |
| 2012/0191231 | A1* | 7/2012 | Wang | G06F 17/30743 700/94 |
| 2012/0240045 | A1* | 9/2012 | Bradley | G10L 13/04 715/716 |
| 2012/0311639 | A1 | 12/2012 | Hill et al. | |
| 2012/0317240 | A1* | 12/2012 | Wang | H04H 60/37 709/219 |

OTHER PUBLICATIONS

Haitsma, Jaap, and Ton Kalker. "A highly robust audio fingerprinting system." Proc. ISMIR. vol. 2. 2002, pp. 1-9.

Katzmaier. Sony TV identifies music with TrackID. Mar. 11, 2011. c|net Australia. http://www.cnet.com.au/sony-tv-identifies-music-with-trackid-339311171.htm. Last accessed Oct. 27, 2011.

Lu, Jian, "Video fingerprinting for copy identification: from research to industry applications," Proceedings of SPIE-Media Forensics and Security XI, vol. 7254, Jan. 2009, http://idm.pku.edu.cn/jiaoxue-MMF/2009/VideoFingerprinting_SPIE-MFS09.pdf, Last accessed May 30, 2012.

Lu. Jian, "Video Fingerprinting and Applications: a review," Media Forensics & Security Conference, Vobile, Inc., San Jose, CA, http://www.slideshare.net/jianlu/videofingerprintingspiemfs09d, Last accessed May 30, 2012.

Media Hedge, "Digital Fingerprinting," White Paper, Civolution and Gracenote, 2010, http://www.civolution.com/fileadmin/bestanden/white%20papers/Fingerprinting%20-%20by%20Civolution%20and%20Gracenote%20-%202010.pdf, Last accessed May 30, 2012.

Milano, Dominic, "Content Control: Digital Watermarking and Fingerprinting," White Paper, Rhozet, a business unit of Harmonic Inc., http://www.rhozet.com/whitepapers/Fingerprinting_Watermarking.pdf, Last accessed May 30, 2012.

Notice of Allowance for U.S. Appl. No. 13/246,558, dated Jan. 4, 2013, 18 pages.

Office Action for U.S. Appl. No. 13/246,558, dated Jan. 3, 2012, 23 pages.

Office Action for U.S. Appl. No. 13/246,558, dated May 3, 2012, 23 pages.

P2P File Sharing. "Altnet Launches Global File Registry," Aug. 3, 2006, published online at [http://www.p2p-weblog.com/50226711/altnet_launches_global_file_registry.php], retrieved Mar. 15, 2012, 4 pages.

Soundhound. Sound2Sound (S2S) Search Science. http://www.soundhound.com/index.php?action=s.sound2sound. Last accessed Oct. 27, 2011.

Wang. An Industrial-Strength Audio Search Algorithm. Paper for Shazam Entertainment. Ltd. http://www.ee.columbia.edu/~dpwe/papers/Wang03-shazam.pdf. Last accessed Oct. 27, 2011, 7 pgs.

Wikipedia. Shazam (service). http://en.wikipedia.org/wiki/Shazam_(service). Last accessed Oct. 27, 2011, 3 pgs.

* cited by examiner

DETECTION OF CREATIVE WORKS ON BROADCAST MEDIA

CROSS REFERENCE TO RELATED APPLICATION

This application is a continuation of U.S. patent application Ser. No. 13/246,558 filed Sep. 27, 2011 and entitled DETECTION OF CREATIVE WORKS ON BROADCAST MEDIA, the contents of which is hereby incorporated by reference in entirety.

TECHNICAL FIELD

This disclosure generally relates to providing identification information for audio portions of a broadcast media stream.

BACKGROUND

Creative works, such as music or other recognizable audio recordings, are often employed in broadcast media, such as for example as background music in television shows or advertisements. Viewers often find interesting such background audio. Oftentimes, such background audio is presented in small snippets, and by the time a viewer determines that he wants to know more about the audio it has stopped playing, or is presently unidentifiable to the viewer. For example, music may be playing in the background of a television show and the viewer becomes interested in purchasing it but does not know the name of the song. In another example, a user may hear a song in a commercial advertisement that he remembers listening to many years ago, but cannot place the name of the song. Yet another example may be an actor making a statement for which the viewer has vague recollection of being part of a famous quote, poem, speech, book, a line from a show/movie, or another literary work, but the viewer does not know the name of such work.

Conventionally, to identify particular audio a user would employ a music recognition application executable from a portable computing device (e.g., cell phone) to record a snippet of the audio of interest, and communicate the snippet to a remote music database server for identification thereof. However, there are several disadvantages to this conventional approach. It may take too much time to access the mobile phone and/or music application. Consequently, by the time the viewer is ready to record the snippet, the audio may have stopped playing. Also, many viewers (e.g., on the order of hundreds or even thousands) may be attempting to identify audio concurrently. For example, if a song is played during a Super-Bowl halftime show, many viewers may attempt to identify the song at the same time. This can result in very high volume of queries including disparate snippets that can consume considerable bandwidth and processing resources. Given such volume, delays in providing respective viewers with media identification information can result due to the amount of information that must be captured, transmitted, and processed in order to determine identification. Additionally, respective captured audio snippets may contain substantial noise at varying levels that can compound processing overhead and/or lead to misidentification.

SUMMARY

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the purpose of this summary is to present some concepts related to some exemplary non-limiting embodiments in simplified form as a prelude to more detailed description of the various embodiments that follow in the disclosure.

In accordance with an implementation, a broadcast media reception component receives a plurality of media streams over a set of channels, and as the plurality of media streams are received an identification component concurrently determines identification information associated with audio segments within the plurality of media streams.

In accordance with another non-limiting implementation, a plurality of media streams is received over a set of channels. Location of an audio segment within the plurality of media streams is determined. Identification information for the audio segment is determined; and metadata is associated with a subset of the plurality of media streams. The metadata indicates location of the audio segment within the plurality of media streams, and it includes identification information for the audio segment.

Furthermore, a non-limiting implementation provides for transmitting a query to an audio identification server to determine identification information associated with an audio portion of at least one media stream on at least one channel. The query comprises location information identifying location of the audio portion in the at least one media stream. A response is received from the audio identification server including identification information corresponding to at least one audio segment associated with the audio portion.

These and other implementations and embodiments are described in more detail below.

DETAILED DESCRIPTION

Overview

Figure 1:
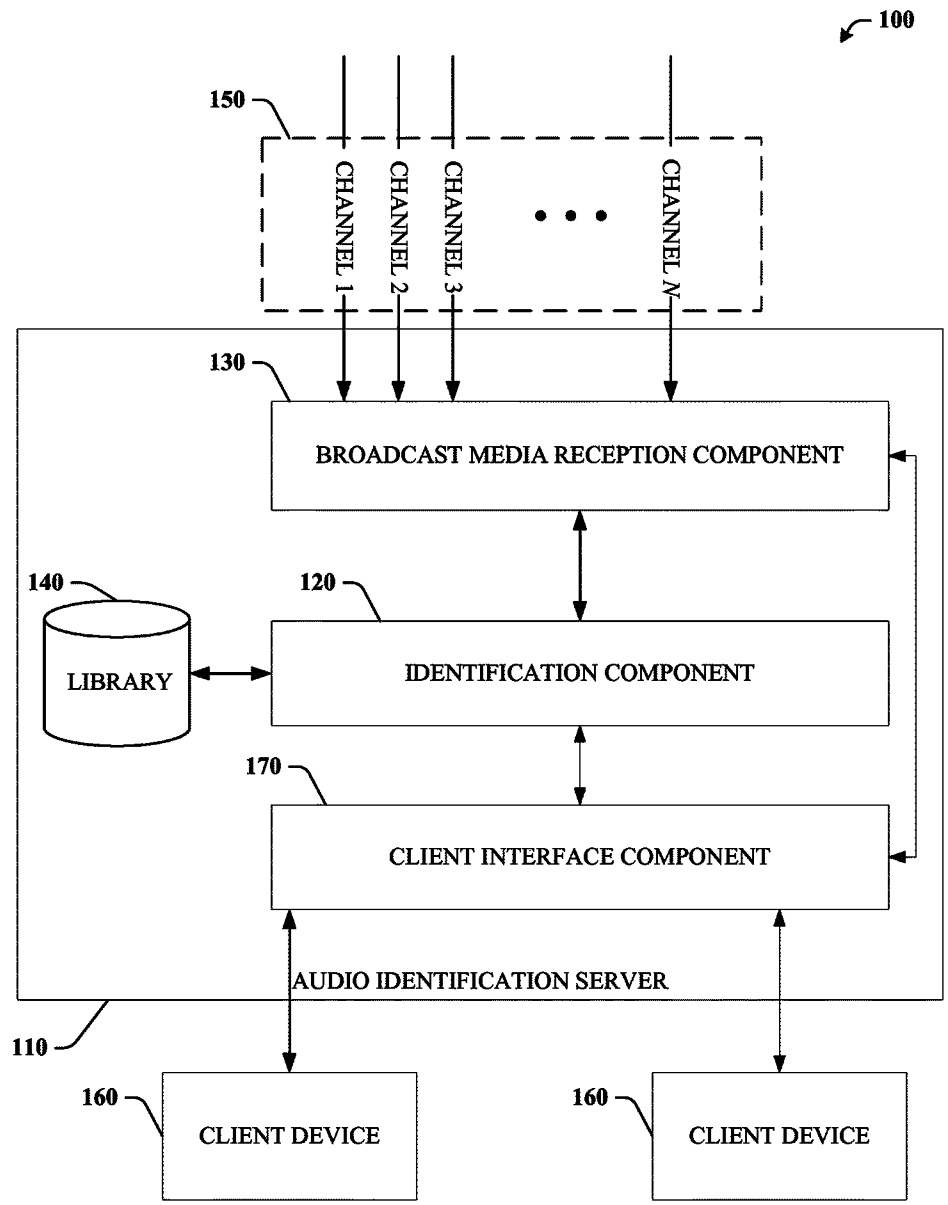
FIG. 1 illustrates a block diagram of an exemplary non-limiting server system that determines identification information for audio segments of broadcast media streams.

Various aspects or features of this disclosure are described with reference to the drawings, wherein like reference numerals are used to refer to like elements throughout. In this specification, numerous specific details are set forth in order to provide a thorough understanding of this disclosure. It should be understood, however, that certain aspects of this disclosure may be practiced without these specific details, or with other methods, components, materials, etc. In other instances, well-known structures and devices are shown in block diagram form to facilitate describing this disclosure.

In accordance with various disclosed aspects, identification information is provided for creative works included in audio portions of broadcast media streams. Creative works (e.g., music, songs, speeches, statements, or other recognizable audio recordings) are often used in broadcast media, such as for example television shows or advertisements. Many times a viewer may find an audio recording interesting or may recognize as having heard it previously. For example, music may be playing in the background of a television show that the viewer enjoys, and he is interested in purchasing it but does not know the identity of the song. In another example, a user may recognize music in a commercial advertisement that he heard many years ago, but cannot place the name of the song. Yet another example may be an actor making a statement for which the viewer has a vague recollection as being part of a famous quote, poem, speech, book, a line from a show/movie, or another literary work, but the viewer does not know identity of the work.

In one or more embodiments, the disclosed aspects relate to providing identification information related to creative works included in an audio portion of a broadcast media stream. For example, a broadcast media stream can be a television presentation, an advertisement, a webcast, a radio presentation, a video conference, or any other type of media that is transmitted in a stream from a transmission device via wireless or wired communication mediums. The identification information can relate to any type of creative work, such as for example a musical recording including voice and/or instrumental work, or a literary work, such as a quote, poem, speech, script, or book.

Accordingly, described below are several non-limiting embodiments that overcome one or more disadvantages associated with conventional audio identification systems.

Example Audio Identification Server

Referring now to the drawings, FIGS. 1-4 provide details regarding an audio identification server 110 and its interaction with client devices 160. With reference initially to FIG. 1, a system 100 that provides identification information for creative works included in audio portions of a broadcast media stream is depicted. System 100 includes an audio identification server 110 that determines identification information for creative works included in audio portions of broadcast media streams and provides the identification information to client devices 160.

Figure 13:
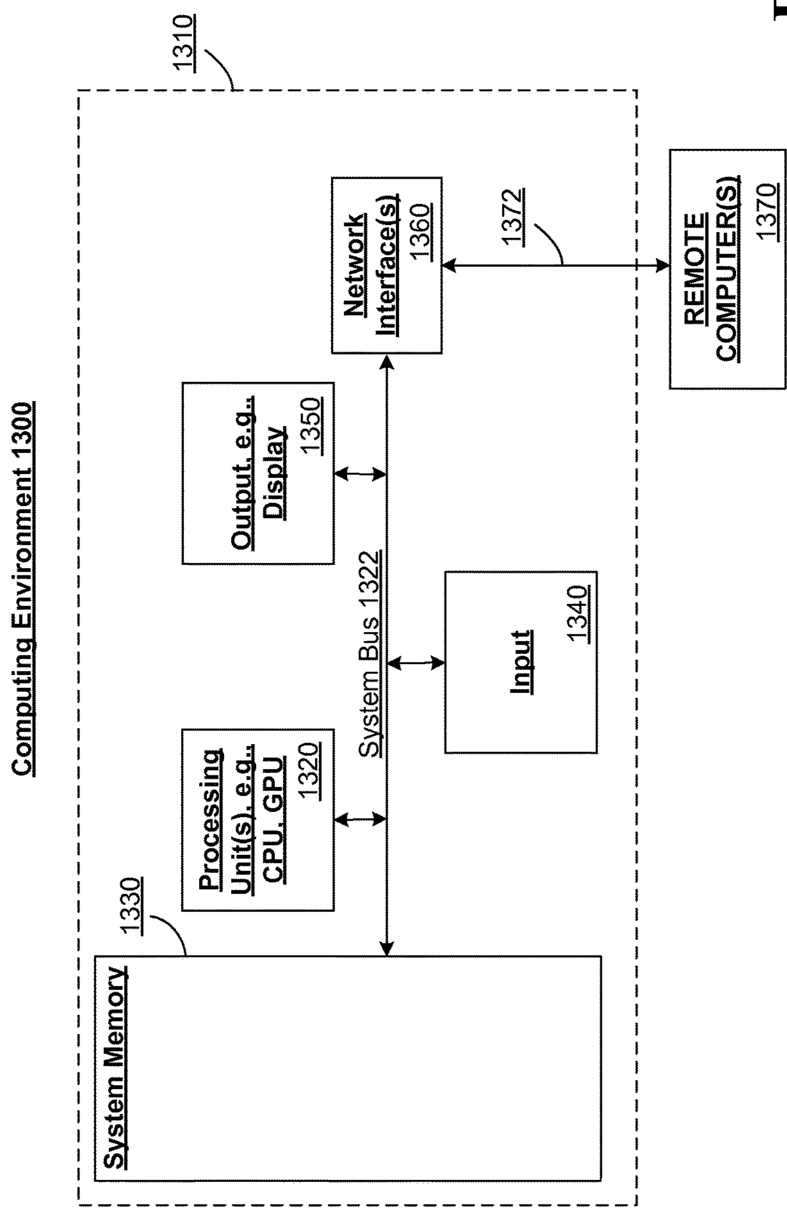
FIG. 13 is a block diagram representing an exemplary non-limiting computing system or operating environment in which the various embodiments may be implemented.

Audio identification server 110 includes a memory that stores computer executable components and a processor that executes computer executable components stored in the memory, a non-limiting example of which can be found with reference to FIG. 13. In one implementation, audio identification server 110 can be incorporated into a broadcasting system (e.g., that of a cable television provider, satellite television provider, internet service provider, digital subscriber line provider, mobile telecommunications provider, cellular provider, radio provider, or any other type of system that provides broadcast media streams via wired or wireless mediums) that provides broadcast media streams to client devices 160. Accordingly, the media streams that are broadcast to client devices 160 can include audio identification information, or the audio identification server 110 can provide such identification information upon request (e.g., from a client device).

In another example, audio identification server 110 can provision (e.g., as a third party service) audio identification to clients in connection with broadcast of media streams. The service can provide audio identification directly to the client devices 160 or to a provider of the broadcast media streams.

The audio identification server 110 includes a broadcast media reception component 130 that receives a plurality of broadcast media streams over channels 150 transmitted through wired or wireless networks. For example, a broadcast media stream can be a television presentation, an advertisement, a webcast, a radio presentation, a video conference, or any other suitable type of media that is broadcast in a stream. Channels 150 comprise any number of channels 1 to N, where N is in integer indicating number of channels.

Audio identification server 110 includes a library 140 of stored data records that contain information for matching and identification of creative works. Library 140 can be stored on any suitable type of storage device, non-limiting examples of which are illustrated with reference to FIGS. 12 and 13.

In addition, audio identification server 110 includes an identification component 120 that determines identification information for audio segments within a broadcast media stream. Audio identification server 110 can also include a client interface component 170 that can process queries for identification information from client devices 160. While only two client devices 160 are depicted, it is to be appreciated that any suitable number of client devices 160 can concurrently interact with the audio identification server 110.

Audio identification server 110 receives a plurality of broadcast media streams, and in substantially real time, proactively determines identification information for audio segments within the broadcast media streams and associates this identification information with the broadcast media streams. In a non-limiting implementation, audio identification server 110 receives M cable channels (M is an integer). Proactively, the audio identification server 110 can concurrently determine identification information for audio segments within the respective M channels. If a viewer requests identification information for a creative work he just heard on a channel, the audio identification server 110, which has determined identification information for the creative work, can immediately provide it to the viewer via the client device 160 thus reducing delay in providing such identification information as compared to conventional systems.

Moreover, in an exemplary implementation, the client device 160 does not need to send an audio snippet or fingerprint to the audio identification server as in conventional systems. In accordance with this implementation, a client device merely provides a request for information associated with a media stream rather than having to collect a snippet of a desired creative work. For example, client device 160 can provide a request indicating a location in the media stream where the viewer is interesting in receiving identification information, as described in further detail below.

Furthermore, if multiple viewers request identification information for the creative work, the audio identification server 110 does not need to redundantly perform (numerous if not hundreds or thousands of times) a determination process associated with analyzing respective submitted audio snippets or fingerprints as is done conventionally on a per viewer basis. By extracting audio directly from the broadcast media stream, quality of the extracted audio can be higher as compared to audio recorded through a microphone on a client device 160.

It is readily apparent from the foregoing example, that at client, network, and server ends resource usage (e.g., related to processing, communication bandwidth, storage . . . ) is substantially reduced as compared to conventional schemes for creative works identification.

The audio identification server 110, in addition to proactively determining identification information, can push the identification information to client devices. In this manner, the client device 160 is be able to respond immediately to a viewer request for identification information. For example, the identification information can be pushed to client devices 160 in the background of respective media streams. The identification information can be masked or unmasked as a function of user requests for such information. The identification information can be displayed concurrently with the media stream, before, or after playback of the media stream. The identification information can be filtered as a function of historical, demographic, or other metrics associated with user viewing or preferences.

FIG. 1 depicts library 140 as included within the audio identification server 110, thereby reducing delay associated with communication had library 140 been located remotely. However, it is to be appreciated that the library 140 can optionally be located remote from the audio identification server 110, while still providing many of the advantages described herein.

Figure 2:
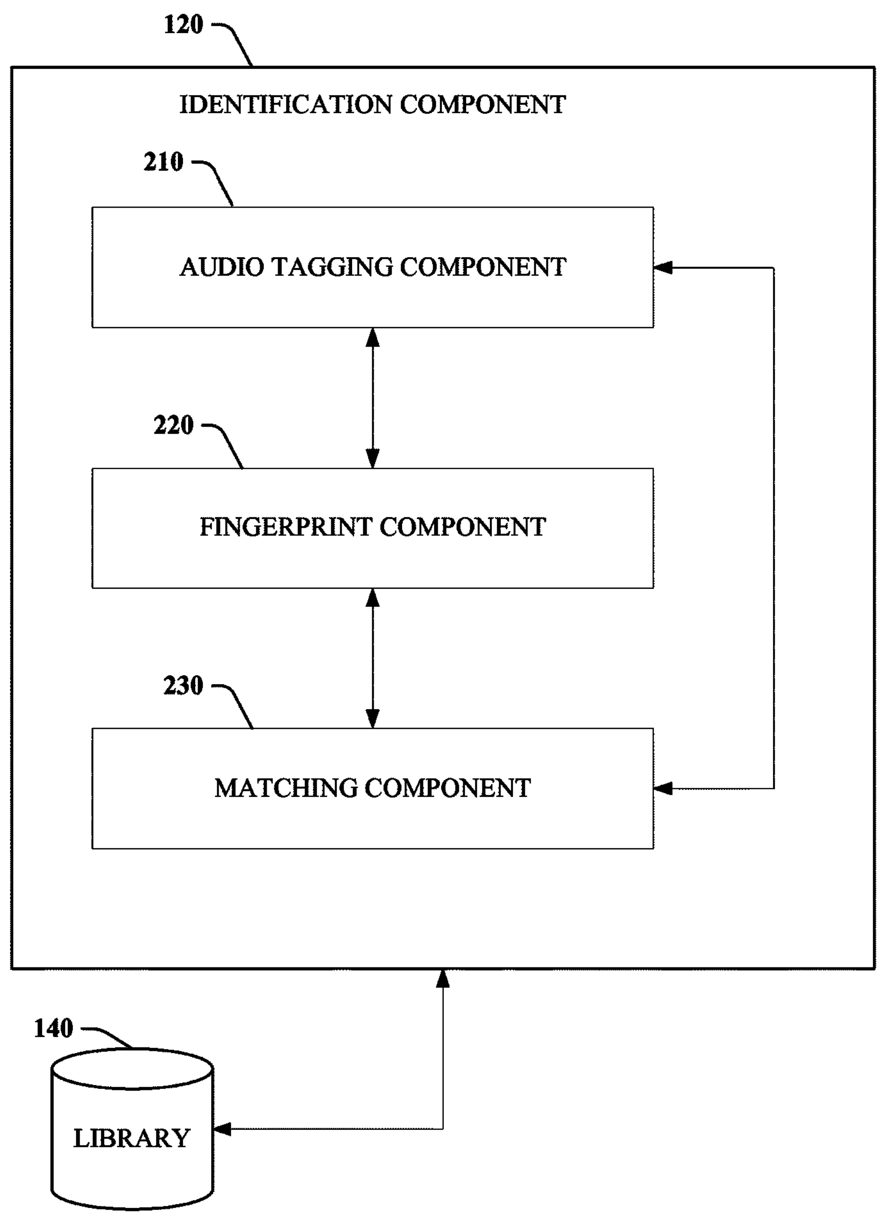
FIG. 2 illustrates a block diagram of an exemplary non-limiting identification component that determines identification information for an audio segment.

Referring to FIG. 2, identification component 120 is illustrated in greater detail. Identification component 120 matches audio segments to records in library 140 and tags the broadcast media streams with identification information associated with the audio segments. Identification component 120 includes audio tagging component 210 that associates metadata to audio segments in the broadcast media streams. The identification component 120 includes fingerprint component 220 that generates digital fingerprints of audio segments of the broadcast media streams. A matching component 230 matches digital fingerprints to data records in the library 140.

Figure 3:
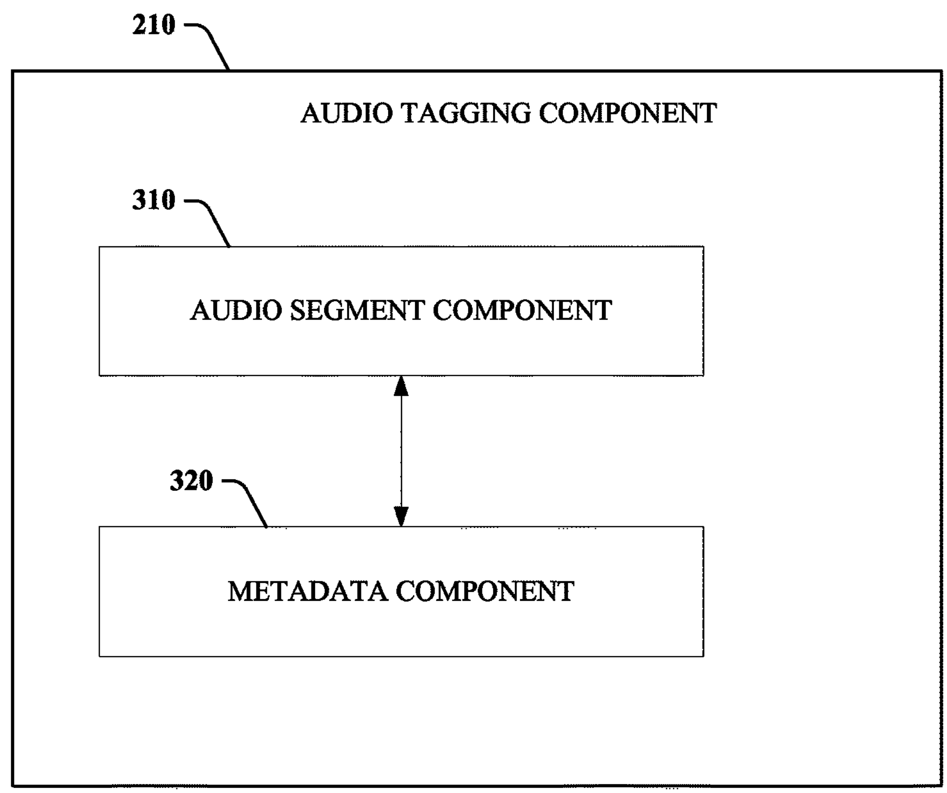
FIG. 3 illustrates a block diagram of an exemplary non-limiting audio tagging component that associates metadata to audio segments of a media stream.

Referring to FIG. 3, a non-limiting implementation of an audio tagging component 210 is illustrated. The audio tagging component 210 infers or determines distinct audio segments within the broadcast media streams in connection with tagging searchable creative works identification information. For example, a distinct audio segment that is tagged may be a segment of the broadcast media stream where a song is playing in the background, or a line or series of lines spoken by an actor. It is to be appreciated that audio segments may overlap each other, and thus a hierarchy of tags can be employed to facilitate pinpoint identification of audio segments or portions thereof. Audio tagging component 210 includes audio segment component 310 which infers or determines audio segments within the media streams. Furthermore, audio tagging component 210 includes metadata component 320 that associates metadata with the media streams. The metadata can provide a vast array of information in connection with identification of creative works—further details regarding the metadata is provided below.

Audio segment component 310 monitors the incoming broadcast media streams from broadcast media reception component 130 and infers or determines distinct audio segments. For example, audio segment component 310 can employ a classification algorithm to determine which audio segments are silent, include spoken voice, include singing, include music, or doesn't contain spoken voice, singing, or music. These classes are non-limiting examples of possible classes for audio segments and one of ordinary skill in the art would recognize that any number of classes of differing types can be employed.

Audio segment component 310 then provides an indication of the class determinations and where in the broadcast media stream they occur. For example, the indication for an audio segment can include one or more categorization types of audio in the segment according to the determination above and a location of occurrence within the broadcast media streams. The location identifies the broadcast media stream and can also include a timestamp or counter to facilitate indicating where the audio segment starts and stops. As noted above, audio segments can overlap. For example, it may be that background music is playing during a conversation between actors. One audio segment may comprise the entirety of the background music. While another overlapping segment may include a portion of an actor's dialogue. The identification information provided can differentiate the overlapping audio, identify existence of overlap, etc.

Metadata component 320 associates data determined or inferred by audio segment component to the broadcast media streams as metadata, which can also be included within identification information. For example, the classifications for an audio segment and the starting and stopping points of the audio segment within the media stream can be included in metadata associated with the broadcast media stream.

Figure 4:
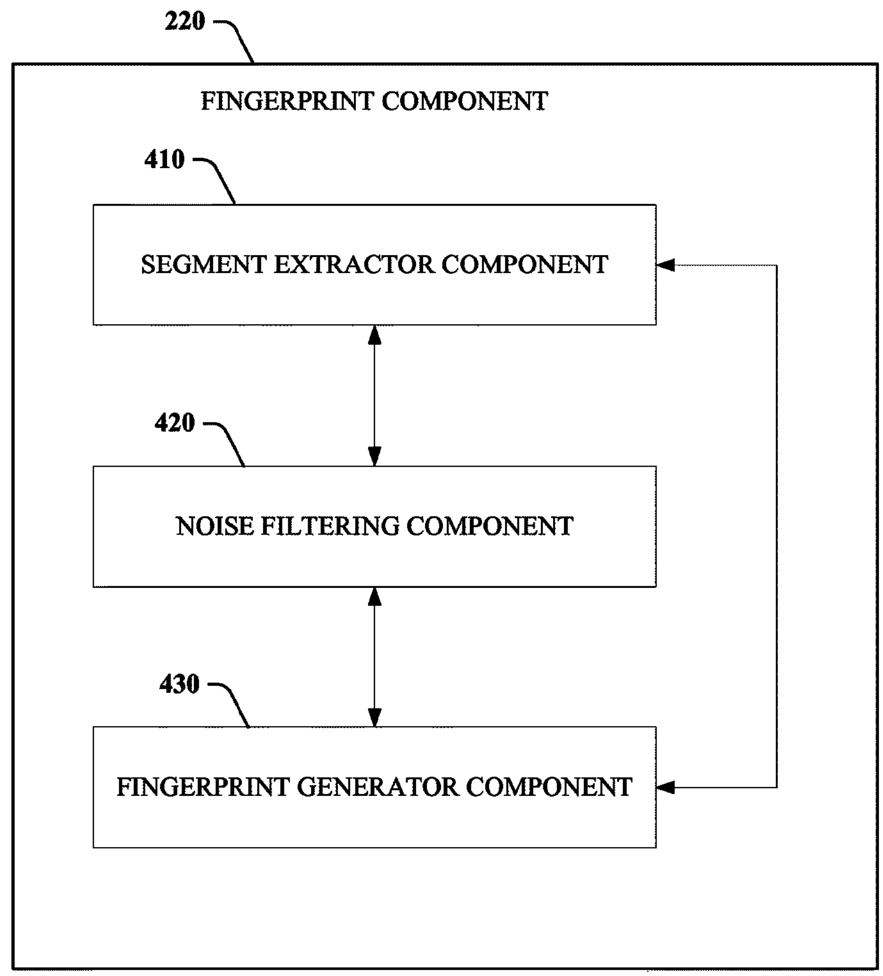
FIG. 4 illustrates a block diagram of an exemplary non-limiting fingerprint component that generates a fingerprint for an audio segment.

Referring to FIG. 4, a non-limiting example of a fingerprint component 220 is illustrated. Fingerprint component 220 generates digital fingerprints of audio segments that are used to match respective audio segments against data records in library 140. Fingerprint component 220 comprises a segment extractor component 410 that extracts audio segments from broadcast media streams. Referring back to FIG. 1, identification component 120 provides for user or administrator setting of preferences for types of audio segments for which identification information is to be determined. Returning to FIG. 4, segment extractor component 410 can limit extraction of audio segments to only those types which are allowed based upon the set preferences. For example, if the audio identification server 110, as depicted in FIG. 1, is only to be used for musical recordings, a corresponding preference can be set such that audio segments that do not contain musical recordings will not be extracted.

Fingerprint component 220 includes a noise filtering component 420 that can filter noise from an extracted audio segment. In a non-limiting implementation, an audio segment categorized as music, may have foreground speech from an actor or explosions from special effects filtered out in order to enhance background music and singing. Based on the type of audio segment, different audio filters can be applied in order to enhance a type of audio to which the audio segment is classified. Audio filters can include any type of filter which modifies the timber, harmonic content, pitch, or waveform of an audio signal, non-limiting examples of which include, low-pass filter, high-pass filter, band-pass filter, band-reject filter, all-pass filter, analog filter, digital filter, non-linear filter, anti-popping filter, power-line hum filter, etc. It is to be understood that performing noise filtering on an extracted audio segment can be optional. For example, there can be user or administrator preference settings indicating whether noise filtering should be performed on particular types of audio, or the noise filtering component can be eliminated altogether.

Fingerprint component 220 also provides a fingerprint generator component 430 that generates digital fingerprints for extracted audio segments. The fingerprint component can also employ voice recognition to convert voice within an audio segment, either spoken or singing, to text. The digital fingerprint and/or the text are employed by matching component 230 in order to identify data records in the library that match the audio segment.

Matching component 230 employs a search or classification algorithm using the digital fingerprint and/or text to identify one or more data records in library 140 that are a match. Matching component 230 also provides for employing a ranking algorithm to determine ranks for the one or more matching data records, for example, according to how closely the data record matched the audio segment. In a non-limiting implementation, a rank can be based on a confidence measure of the data record matching the audio segment. Furthermore, matching component 230 can employ a confidence threshold by which data records that fall below the confidence threshold are not considered a match.

Audio tagging component 210 then associates metadata to the media stream indicating identification information from the one or more data records matching the audio segment. Furthermore, the identification information associated as metadata can include the determined rank. Additionally, audio tagging component 210 can identify and associate purchase information with the identification information indicating a purchase mechanism for the creative work. It is to be appreciated that the purchase information can be included in library 140 or a component, e.g., audio tagging component 210, can search for purchase information, for example, via the internet. For example, the indication can be a selectable link for immediate purchase of the creative work or a selectable link to a shopping portal/interface where the creative work can be purchased. For instance, if creative work is identified as a song, then purchase information for the song and/or album can be associated. In another instance, the creative work can be identified as a movie from which the audio segment used a line, and purchase information for the movie can be associated. To provide additional clarification, for example, a viewer can be watching a television show in which an actor quotes a line from a movie and the viewer may be interested in purchasing the movie or items related to the movie. As another example, if the creative work is a book from which a line was quoted, purchase information for the book can be associated.

Library 140 includes data records for creative works. The data records include data that can be used for matching the digital fingerprint and/or text generated from the audio segment. For example, the data record can include a digital fingerprint of the creative work. Additionally, the data record includes identification information for the creative work. In a non-limiting example, the identification information can include any type of metadata that is conventionally known and employed in connection with that type of creative work. For example, a musical recording can include metadata comprising title, artist, album, year, track genre, length, composer, lyrics, parental rating, album art, etc. One skilled in the art would readily recognize that, based on the type of creative work, there are well known metadata types that are conventionally associated. However, the identification information is not limited to only those well-known metadata types. Any type of metadata associated with the creative work can be added to the identification information. For example, the purchase information disclosed above, as well as information identifying a location of an audio segment within a broadcast media stream can be included as metadata.

Moreover, library 140 can be periodically updated, manually or automatically, to reflect data record additions, deletions, or changes. For example, an administrator can manually make adjustments to data records in the library 140. In addition or in the alternative, library 140 can be updated automatically by a service, for example, a subscription service for music or publishing information.

Client device 160 can be any type of device that receives broadcast media streams, for example, mobile phone, personal data assistant, laptop computer, tablet computer, desktop computer, server system, cable set top box, satellite set top box, cable modem, television set, media extender device, video cassette recorder device, blu-ray device, DVD (digital versatile disc or digital video disc) device, compact disc device, video game system, audio/video receiver, radio device, portable music player, navigation system, car stereo, etc. In one example, client device 160 queries identification information for audio portions of broadcast media streams. In another example, client device 160 receives identification information for audio segments of broadcast media streams without having initiated a specific query for this information (e.g., identification information can be pushed to the client device).

As another example, client device 160 can subscribe to receive identification information for selected broadcast media streams and/or channels, such as by user preference settings. In another example, identification information can be pushed for all broadcast media streams received by client device 160, which may be only a portion of the broadcast media streams received at the audio identification server 110. In this scenario, certain client devices 160 may only receive some broadcast media streams, for example, based upon paid subscriptions or based upon type of device.

In one embodiment, client interface component 170 receives a query from client device 160 to provide identification information associated with an audio portion of a broadcast media stream. For example, a viewer at client device 160 may be watching a show and hear a song that she would like identified. The viewer then initiates a request for identification information associated with the audio portion of the broadcast media stream in which she heard the song. Client device 160 sends a query to client interface component 170 providing information about the audio portion of the broadcast media stream. For example, this information can include an identifier for the broadcast media stream, such as a channel identifier, and further include an identifier of where the audio portion is located in the broadcast media stream. This location identifier can include a timestamp or counter value associated with the broadcast media stream. Moreover, the timestamp or counter value may indicate a single point in the stream, or a time or counter range. Given this information about the audio portion received in the query, client interface component 170 examines the metadata associated with the broadcast media stream by identification component 120 in order to provide identification information associated with creative works located in audio segments at or near the timestamp or counter value provided in the query.

Keeping in mind that the viewer can be initiating her request with some delay from the time she heard the creative work, the client device 160 may accommodate this in the range sent in the query, for example to include a predetermined buffer of time or counter value to compensate for the delay. For example, the client device may have the time range start 30 seconds before the viewer initiated the request. Furthermore, client interface component 170 can, in addition or alternatively to the client device providing this compensation, expand the time or counter range for which it provides identification information by a predetermined amount. For example, the client device 160 may merely provide a timestamp or counter value that is a point in time when the viewer made the request and the client interface component 170 may provide identification information for creative works within a predetermined range previous or subsequent to the timestamp in the query. Client interface component 170 responds to the query by providing identification information associated with creative works located in audio segments at or near the timestamp or counter value/range provided in the query.

Example Client Device Interacting with Audio Identification Server

Figure 5:
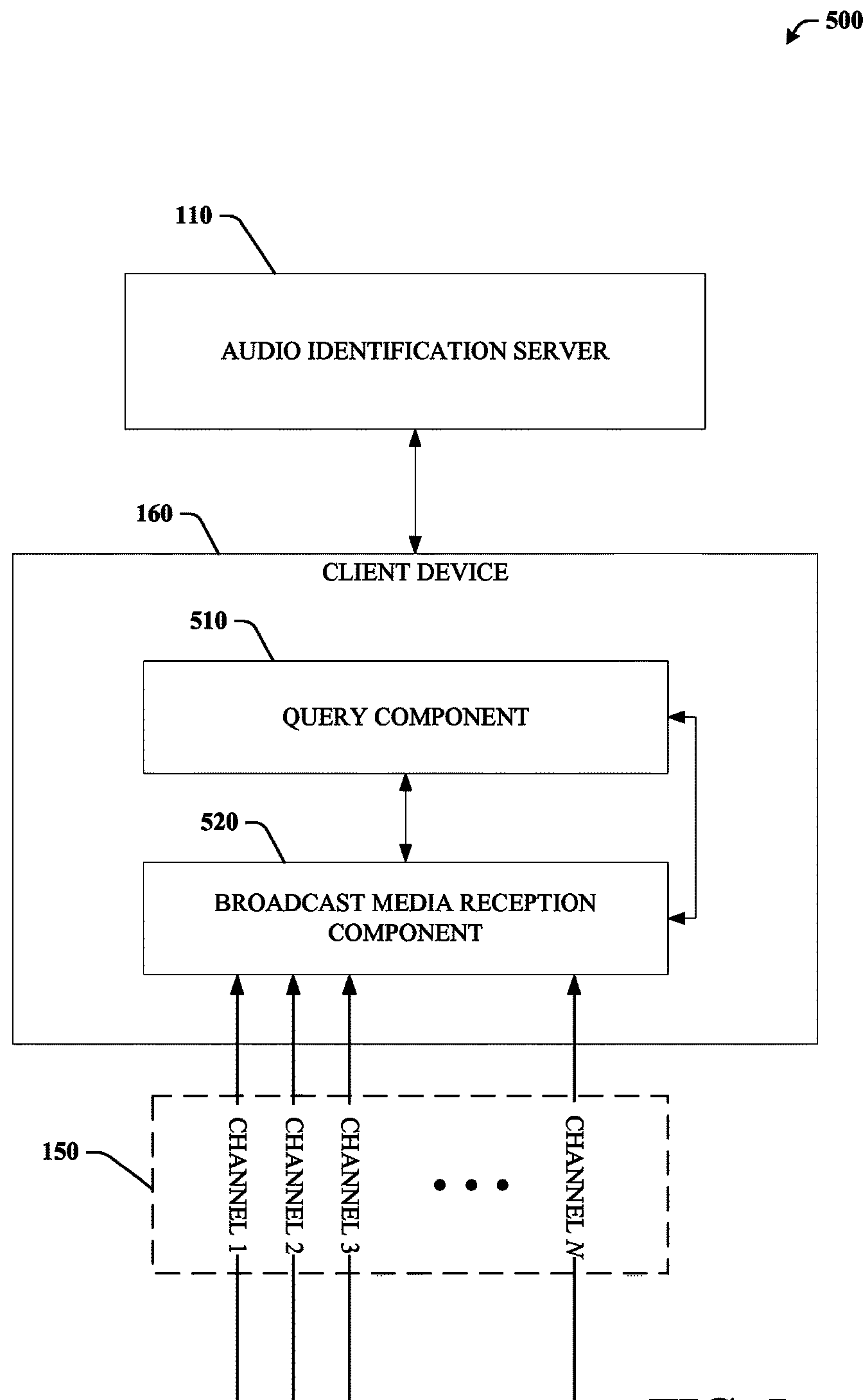
FIG. 5 is a block diagram of an exemplary non-limiting system that provides identification information for audio segments of broadcast media streams.

Referring to FIG. 5, a system 500 that provides identification information for creative works included in audio portions of a broadcast media stream is depicted. Particularly, FIG. 5 provides additional details regarding client device 160 and its interactions with audio identification server 110. System 500 includes audio identification server 110, as discussed above, that can determine identification information for creative works included in audio portions of broadcast media streams and provide the identification information to client device 160.

Client device 160 includes broadcast media reception component 520, which can be similar to broadcast media reception component 130 depicted above in FIG. 1, to receive broadcast media streams over channels 150. It is to be appreciated that the broadcast media streams and channels received at client device 160 may only be a portion of the broadcast media streams and channels received at audio identification server 110. Client device 160 also includes query component 510 that queries authentication server 110 for identification information associated with an audio portion of a broadcast media stream. This query can be automatically initiated based upon a preference setting in the client device 160, or may be initiated based upon a request provided by a viewer employing the client device, for example. In a non-limiting implementation, client device 160 provides preference settings that allow a viewer to specify particular broadcast media streams or channels for which she would like to automatically receive identification information. In addition, the automatically generated query can have associated preference settings that allow for specifying an interval at which the query is generated and have a time or counter range in the query of at least the size of the interval. In this manner, the query will result in identification information being provided for the time period since the last query was generated.

In another, non-limiting implementation, the viewer can manually initiate the query through an input device, non-limiting examples of which are described below in relation to FIG. 13. Query component 510 further receives identification information from audio identification server 110 in response to the query. Client device 160 further outputs the received identification information, e.g., displaying the received identification information on a display device, which can be found with reference to FIGS. 12 and 13. The display device can be included within client device 160 or remotely connected to client device 160. Furthermore, in a non-limiting implementation, the displayed identification information can be organized on the display by audio segment and/or rank. The identification information can be organized and displayed in many different, suitable manners all of which are intended to fall within the scope of this invention.

Client device 160 further provides for sending a snippet of audio recording associated with the audio portion as part of the query. For example, in an implementation where the audio identification server 110 does not proactively determine identification information for a type of audio, an audio snippet can be included in the query from the client device 160. In order to compensate for delay in user initiating a request for identification information, client device 160 can continuously buffer a predetermined amount of recorded audio associated with a broadcast media stream and send this buffer of recorded audio with the query. Audio identification server 110 then employs, this buffer of recorded audio to determine identification information, for example, in the manner it performs for received broadcast media streams. Accordingly, rather than a manual process in which a user attempts to capture a snippet using his phone, in one embodiment an automated process is employed in which the client device is continuously buffering audio from the media stream, so the client device is ready to send a relevant snippet when the user initiates a query.

Example Client Device with Built in Audio Identification Server

Figure 6:
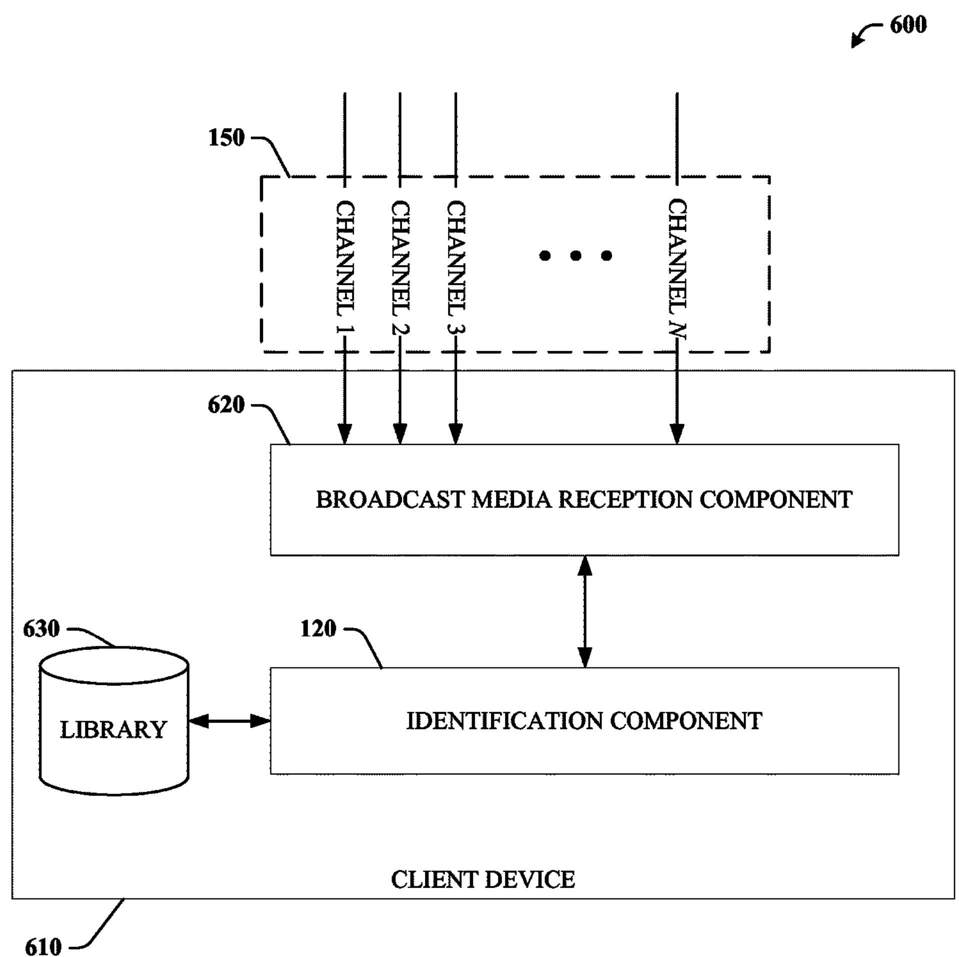
FIG. 6 illustrates an exemplary non-limiting client system that determines identification information for audio segments of broadcast media streams.

Referring to FIG. 6, a system 600 that provides identification information for creative works included in audio portions of a broadcast media stream is depicted. System 600 can include client device 610 that can determine identification information for creative works included in audio portions of broadcast media streams.

Client device 610 includes broadcast media reception component 620 which can be similar to broadcast media reception component 130 depicted above in FIG. 1, to receive broadcast media streams 150. It is to be appreciated that the broadcast media streams and channels received at client device 610 may the same, a subset of, or different from the broadcast media streams and channels received at audio identification server 110. In addition, client device 610 comprises identification component 120, as discussed above, and library 630 to determine identification information for creative works included in audio portions of broadcast media streams. By incorporating identification component 120 and library 630 within client device 610, client device 610 is not reliant on an external resource to determine identification information for broadcast media streams that the client device is receiving. Library 630 can be the same, a subset of, or different than library 140 depicted in FIG. 1 and similarly can be periodically updated. Client device 610 further, based upon viewer request, displays the identification information on a display device, which can be found with reference to FIGS. 12 and 13.

Client device 610 can be any type of device that receives broadcast media streams, for example, mobile phone, personal data assistant, laptop computer, tablet computer, desktop computer, server system, cable set top box, satellite set top box, cable modem, television set, media extender device, video cassette recorder device, blu-ray device, DVD (digital versatile disc or digital video disc) device, compact disc device, video game system, audio/video receiver, radio device, portable music player, navigation system, car stereo, etc.

FIGS. 7-11 illustrate various methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

Figure 7:
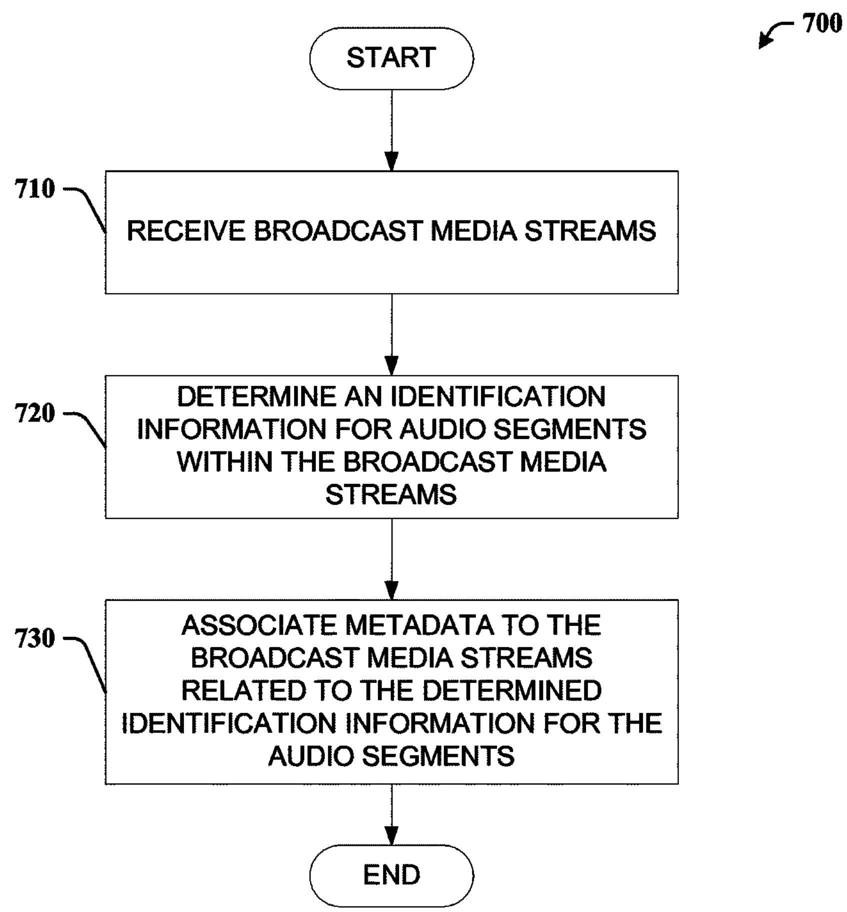
FIG. 7 is an exemplary non-limiting flow diagram for determining identification information for audio segments of broadcast media streams.

Referring to FIG. 7, an exemplary method 700 for determining identification information for audio segments of broadcast media streams is depicted. At reference numeral 710, a plurality of broadcast media streams are received (e.g. by a broadcast media reception component), e.g. substantially concurrently. At reference numeral 720, identification information, as discussed above, is determined (e.g. by an identification component 120) for audio segments within the broadcast media streams. At reference numeral 730, the broadcast media streams have metadata associated (e.g. by an identification component 120) to the streams that includes the identification information related to audio segments within the streams. It is noted that operations of method 700 can be performed in substantially real-time and concurrently for a plurality of broadcast media streams, thereby having identification information readily available for viewer requests with minimal delay.

Figure 8:
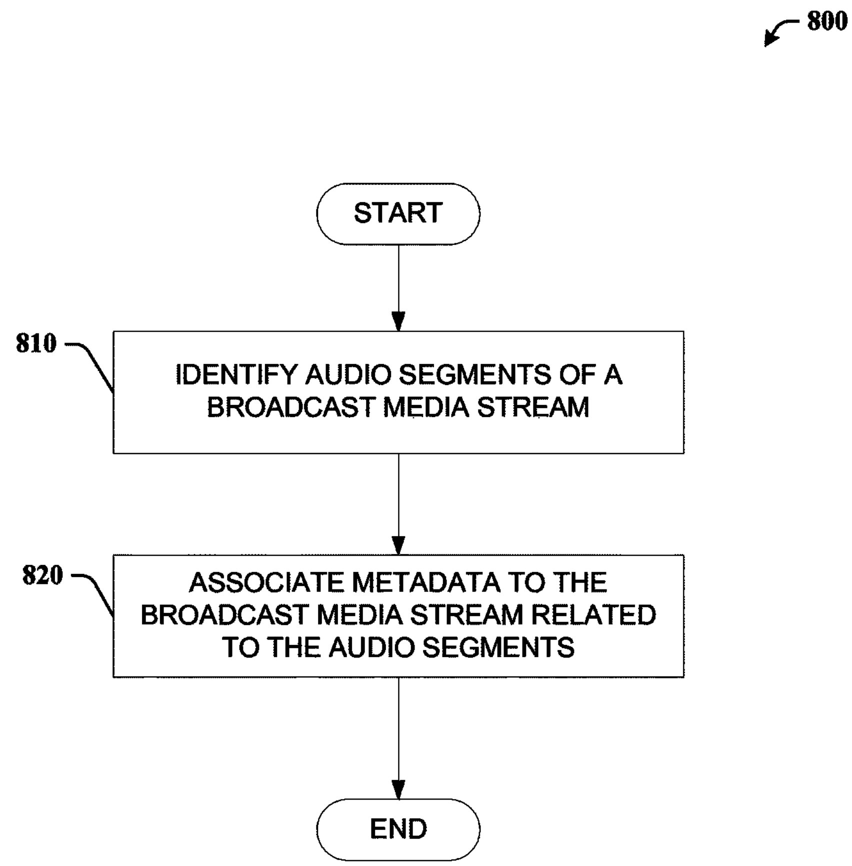
FIG. 8 is an exemplary non-limiting flow diagram for identifying audio segments.

Referring to FIG. 8, an exemplary method 800 for identifying audio segments of a broadcast media stream is depicted. At 810, audio segments of a broadcast media are identified (e.g. by an audio segment component 310 within audio tagging component 210). For example, a broadcast media stream may be monitored to infer distinct audio segments. For example, a classification algorithm can be employed to determine which audio segments are silent, include spoken voice, include singing, include music, or doesn't contain spoken voice, singing, or music. These classes are non-limiting examples of possible classes for audio segments and it is to be appreciated that any suitable number of classes of differing types can be employed. An indication can be provided of the class determinations and where in the broadcast media stream they occur. For example, the indication for an audio segment can include one or more categorization types of audio in the segment according the determination above and a location of occurrence within the broadcast media streams. The location can identify the broadcast media stream and further include a timestamp or counter, which can include a range indicating where the audio segment starts and stops. Moreover, audio segments can overlap. At 820, metadata related to an audio segment is associated (e.g. by a metadata component 320) to a broadcast media stream in which the audio segment is included. For example, the categorization types for an audio segment and the starting and stopping points of the audio segment within the media stream are associated as metadata to the broadcast media stream, said metadata can also be included within identification information. For example, the identification information can include the categorization types and starting and stopping points of an audio segment along with metadata identifying creative works within the audio segment.

Figure 9:
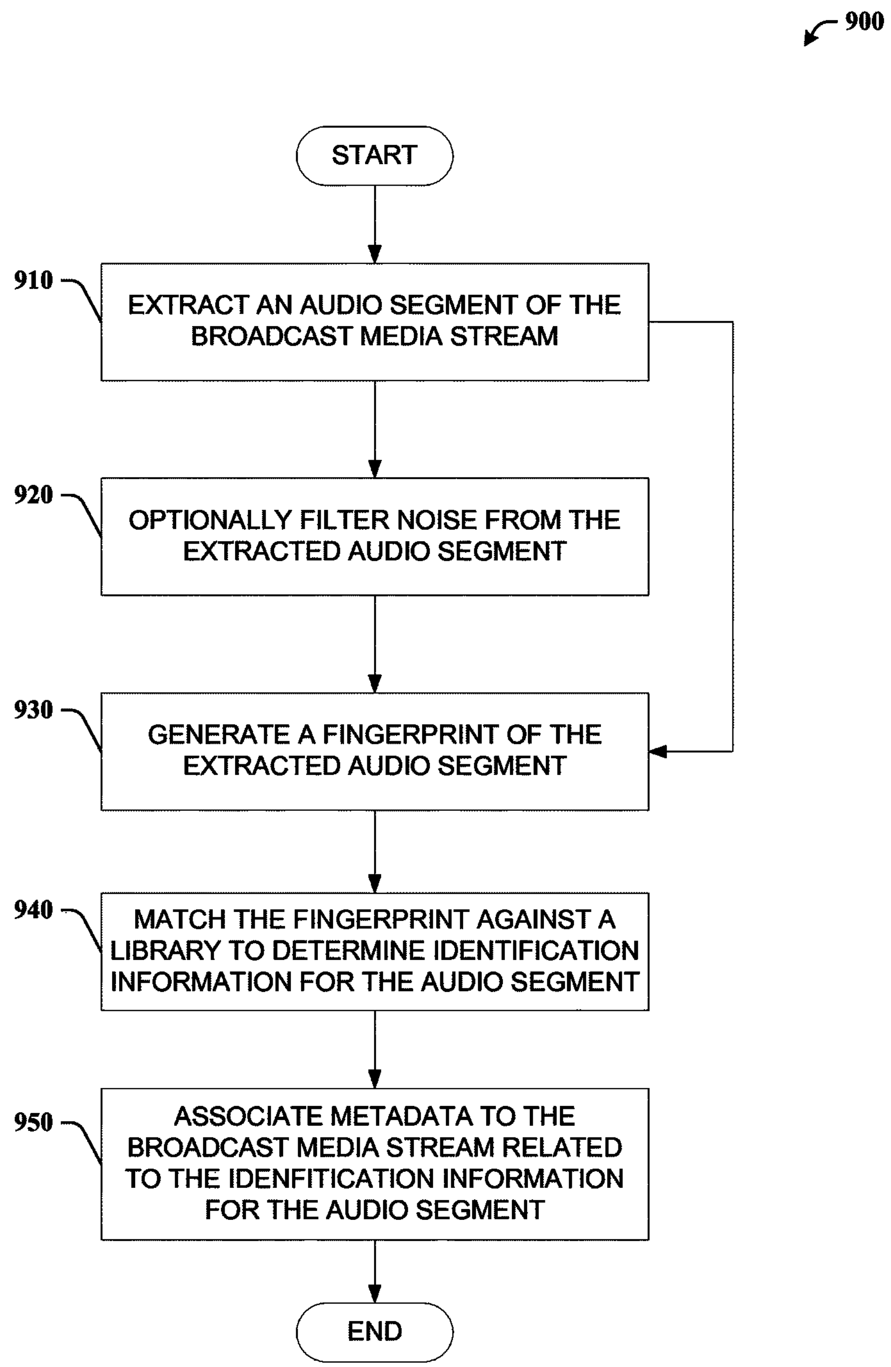
FIG. 9 is an exemplary non-limiting flow diagram for determining identification information for an audio segment.

Referring to FIG. 9, an exemplary method 900 for generating a digital fingerprint of an extracted audio segment is shown. At 910 an audio segment from a broadcast media stream is extracted (e.g. by a segment extractor component). At 920, noise is filtered (e.g. by a noise filtering component) from an extracted audio segment. It is to be understood that performing noise filtering on an extracted audio segment can be optional. For example, there can be preference settings indicating whether noise filtering should be performed based on type of audio, or the noise filtering can be eliminated altogether. At 930, a digital fingerprint is generated (e.g. by a fingerprint generator component) for the extracted audio segment. Voice recognition can also be employed to convert voice within an audio segment, either spoken or singing, to text. The text can be associated (e.g. by a fingerprint component) with the digital fingerprint. At 940, the digital fingerprint and/or the text are employed in order to identify data records in the library that match the audio segment. Search and/or classification algorithms are employed (e.g. by a matching component) using the digital fingerprint and/or text to identify one or more data records in a library that are a match. Furthermore, a ranking algorithm can be employed to determine ranks for the one or more matching data records according to how closely the data record matched the audio segment. A rank can be based on a confidence measure of the data record matching the audio segment. Additionally, a confidence threshold can be utilized to determine which data records are not considered a match.

At 950, metadata is associated (e.g. by a metadata component) to the media stream indicating identification information from the one or more data records matching the audio segment. The identification information can include the determined rank. Additionally, purchase information can be included with the identification information indicating a purchase mechanism for the creative work. In one example, the indication is a selectable link for immediate purchase of the creative work or a selectable link to a shopping portal/interface where the creative work can be purchased. For instance, if creative work is identified as a song, then purchase information for the song and/or album can be associated. In another instance, the creative work may be identified as a movie from which the audio segment included a line, and purchase information for the movie and/or script, as well as related products, such as soundtracks, posters, toys, etc., can be associated. In another example, if the creative work is a book from which text was quoted in the audio segment, purchase information for the book can be associated.

Figure 10:
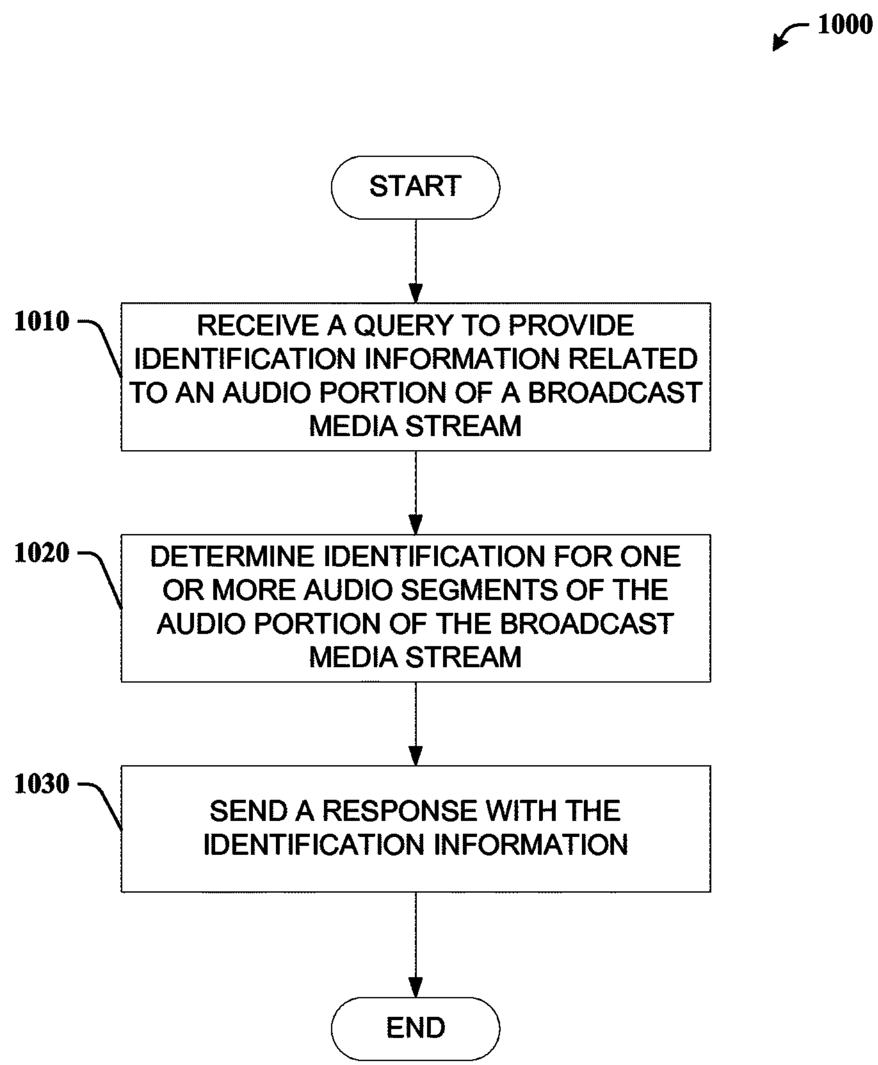
FIG. 10 is an exemplary non-limiting flow diagram for responding to a query for identification information.

Referring to FIG. 10, exemplary method 1000 for processing a query for identification information is depicted. At 1010, a query is received (e.g. from a client device) to provide (e.g. by a client interface component) identification information associated with an audio portion of a broadcast media stream. The query includes information about the audio portion of the broadcast media stream. For example, this information can include an identifier for the broadcast media stream, such as a channel identifier, and further include an identifier of where the audio portion is located in the broadcast media stream. In an example, the location identifier includes a timestamp or counter value associated with the broadcast media stream. Moreover, the timestamp or counter value can be a single point in the stream, or a time or counter range. At 1020, the information about the audio portion is employed to examine metadata associated with the broadcast media stream in order to determine identification information associated with creative works located in audio segments at or near the timestamp or counter value/range provided in the request (e.g. by a client interface component). Keeping in mind that the viewer can be initiating their request with some delay from the time they heard the creative work, the range sent in the query can include a predetermined buffer of time or counter value to compensate for the delay. In addition or alternatively to the query providing this compensation, operation at 1020 can expand (e.g. by a client interface component) the time or counter range for which it provides identification information by a predetermined amount. At 1030, a response to the query is provided (e.g. to a client device) including identification information associated with creative works located in audio segments at or near the timestamp or counter value/range provided in the query (e.g. by a client interface component).

Figure 11:
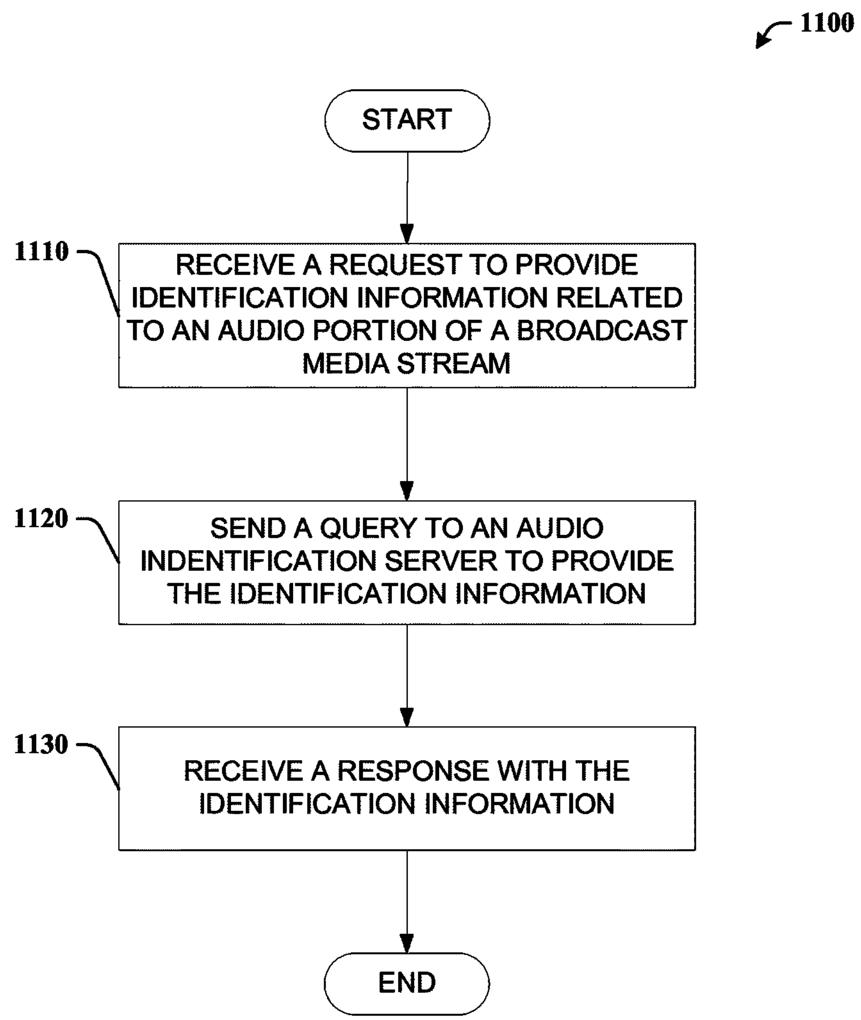
FIG. 11 is an exemplary non-limiting flow diagram for querying identification information.

Referring to FIG. 11, exemplary method 1100 for sending a query for identification information is depicted. At 1110, a request is received (e.g. from an input device), for example from a viewer, to provide identification information associated with an audio portion of a broadcast media stream. At 1120, a query is sent (e.g. by a client device) to an audio identification server to provide the requested identification information. The query includes information about the audio portion of the broadcast media stream. For example, this information can include an identifier for the broadcast media stream, such as a channel identifier, and further include an identifier of where the audio portion is located in the broadcast media stream. In an example, the location identifier includes a timestamp or counter value associated with the broadcast media stream. Moreover, the timestamp or counter value can include a single point in the stream, or a time or counter range. Keeping in mind that the viewer can be initiating their request with some delay from the time they heard the creative work, the range sent in the query can include a predetermined buffer of time or counter value to compensate for the delay. At 1130, a response to the query is received (e.g. by a client device from an audio identification server) including identification information associated with creative works located in audio segments at or near the timestamp or counter value/range provided in the query. As discussed above, the identification information can also include purchase information.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
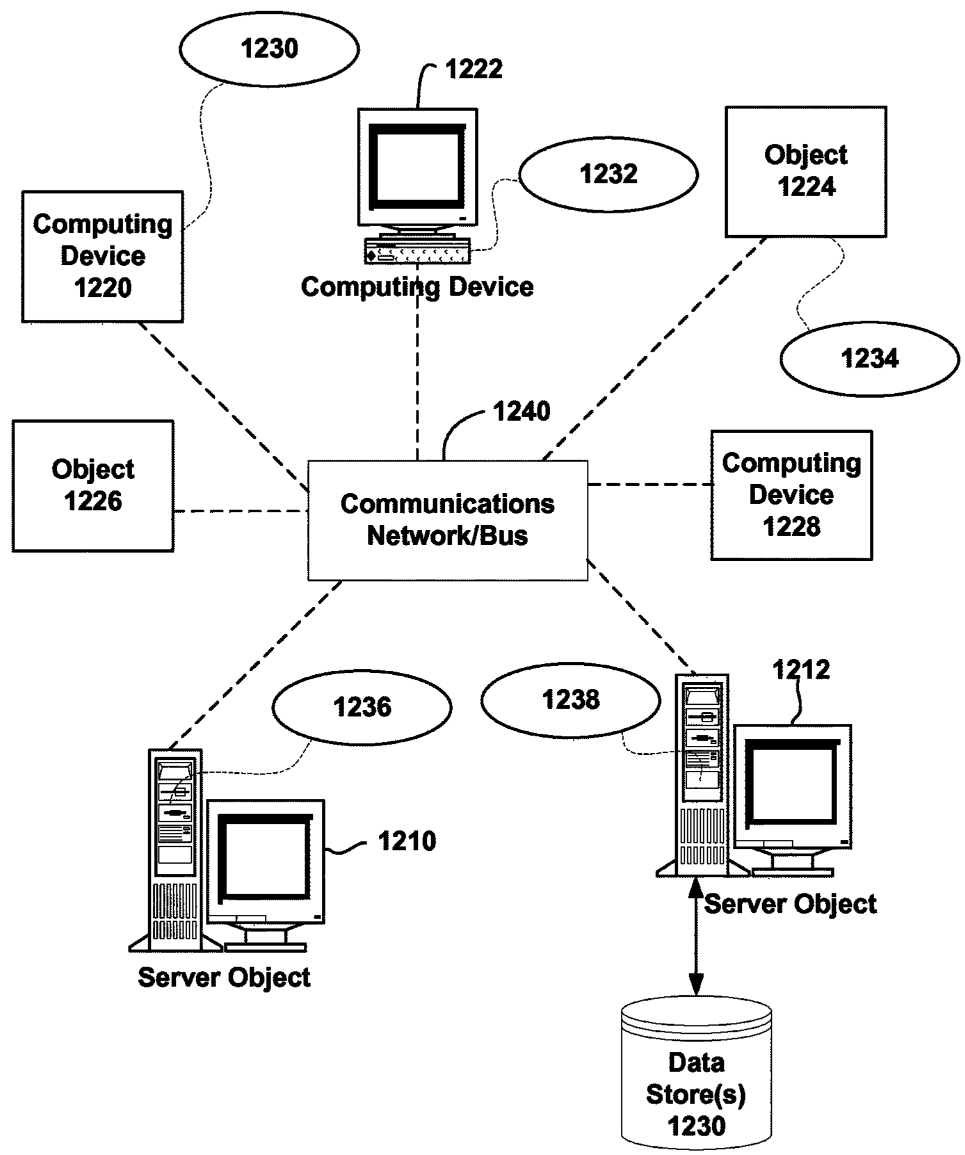
FIG. 12 is a block diagram representing an exemplary non-limiting networked environment in which the various embodiments can be implemented.

FIG. 12 provides a schematic diagram of an exemplary networked or distributed computing environment. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, tablets, etc.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1240 is the Internet, for example, the computing objects 1210, 1212, etc. can be Web servers, file servers, media servers, etc. with which the client computing objects or devices 1220, 1222, 1224, 1226, 1228, etc. communicate via any of a number of known protocols, such as the hypertext transfer protocol (HTTP). Objects 1210, 1212, etc. may also serve as client computing objects or devices 1220, 1222, 1224, 1226, 1228, etc., as may be characteristic of a distributed computing environment.

Exemplary Computing Device

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 13 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing environment 1300 be interpreted as having any dependency or requirement relating to any one or combination of components illustrated in the exemplary operating environment 1300.

With reference to FIG. 13, an exemplary computing device for implementing one or more embodiments in the form of a computer 1310 is depicted. Components of computer 1310 may include, but are not limited to, a processing unit 1320, a system memory 1330, and a system bus 1322 that couples various system components including the system memory to the processing unit 1320.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, memory 1330 may also include an operating system, application programs, other program modules, and program data.

A user can enter commands and information into the computer 1310 through input devices 1340, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1310. A monitor or other type of display device is also connected to the system bus 1322 via an interface, such as output interface 1350. In addition to a monitor, computers can also include other peripheral output devices such as speakers and a printer, which may be connected through output interface 1350.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has,"

"contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in the numerous inferences described herein (e.g. inferring audio segments), components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A device, comprising:

at least one processor; and at least one non-transitory computer readable medium communicatively coupled to the at least one processor, the at least one non-transitory computer readable medium having stored therein computer-executable components, comprising:

a media reception component that receives a set of media streams over a set of channels, the set of media streams comprising a plurality of audio segments and location of each audio segment being identified by corresponding audio segment location information; and an identification component that:

receives a user preference setting input that indicates a preference of a user for types of audio segments for which identification information of one or more types of creative works is to be determined, wherein a creative work is a type of recognizable audio recording included in one or more audio segments of the set of media streams;

extracts a plurality of audio segments based on the received user preference setting input and the audio segment location information of the plurality of audio segments;

determines respective identification information from the plurality of audio segments, wherein determining the respective identification information is concurrent with the media component receiving the set of media streams, and wherein determining the respective identification information comprises:

receiving a hierarchy of tags associated with the plurality of audio segments, each tag corresponding to a characterization type of audio and associated with an audio segment;

identifying overlap among the plurality of audio segments within each received media stream based on the hierarchy of tags;

determining the respective identification information based on the application of the hierarchy of tags to the plurality of audio segments; and for each audio segment of the plurality of audio segments, associating metadata with the audio segment, the metadata indicating a respective media stream of the set of streams from which the audio segment of the plurality of audio segments was extracted and a location identifier indicating a temporal location of the audio segment in the respective media stream; and after determining the respective identification information:

receives a query from a client device, the query including a stream identifier that identifies a specific stream from the set of media streams, and further including an audio portion location identifier indicating a time or range of time in the media stream for which identification information is requested, wherein the audio portion location identifier includes at least one of a timestamp or counter value;

retrieves identification information corresponding to the query based on the stream identifier, the audio portion location identifier, and the metadata associated with the retrieved identification information; and transmits the retrieved identification information to the client device.

2. The device of claim 1, wherein the audio portion location identifier includes a predetermined range that includes timestamp or counter values prior to the at least one of the timestamp or counter value included in the audio portion location identifier.

3. The device of claim 2, wherein a client interface component adjusts the predetermined range based upon the audio portion location identifier.

4. The device of claim 1, wherein the identification component generates a hierarchical organization of the plurality of audio segments, wherein at least two audio segments have respective audio segment location information that at least partially overlap.

5. The device of claim 1, wherein the identification component comprises a fingerprint component that generates a fingerprint for an audio segment of the plurality of audio segments.

6. The device of claim 5, wherein the identification component comprises a matching component that matches the fingerprint to a data record in an audio library.

7. A method, comprising:

receiving, by a device including a processor, a set of media streams over a set of channels, the set of media streams comprising a plurality of audio segments and location of each audio segment being identified by corresponding audio segment location information; and receiving, by the device, a user preference setting input that indicates a preference of a user for types of audio segments for which identification information of one or more types of creative works is to be determined, wherein a creative work is a type of recognizable audio recording included in one or more audio segments of the set of media streams;

extracting, by the device, a plurality of audio segments based on the received user preference setting input and the audio segment location information of the plurality of audio segments; and determining, by the device, respective identification information from the plurality of audio segments, wherein determining the respective identification information is concurrent with the device receiving the set of media streams, and wherein determining the respective identification information comprises:

receiving a hierarchy of tags associated with the plurality of audio segments, each tag corresponding to a characterization type of audio and associated with an audio segment;

identifying overlap among the plurality of audio segments within each received media streams based on the hierarchy of tags;

determining the respective identification information based on the application of the hierarchy of tags to the plurality of audio segments, and for each audio segment of the plurality of audio segments, associating metadata with the audio segment, the metadata indicating a respective media stream of the set of streams from which the audio segment of the plurality of audio segments was extracted and a location identifier indicating a temporal location of the audio segment in the respective media stream; and after determining the respective identification information:

receiving a query from a client device, the query including a stream identifier that identifies a specific stream from the set of media streams, and further including an audio portion location identifier indicating a time or range of time in the media stream for which identification information is requested, wherein the audio portion location identifier includes at least one of a timestamp or counter value;

retrieving identification information corresponding to the query based on the stream identifier, the audio portion location identifier, and the metadata associated with the retrieved identification information; and transmitting the retrieved identification information to the client device.

8. The method of claim 7, wherein the audio portion location identifier includes a predetermined range that includes timestamp or counter values prior to the at least one of the timestamp or counter value included in the audio portion location identifier.

9. The method of claim 8, further comprising adjusting, by the device, the predetermined range based upon the audio portion location identifier.

10. The method of claim 7, further comprising generating, by the device, a hierarchical organization of the plurality of audio segments, wherein at least two audio segments have respective audio segment location information that at least partially overlap.

11. The method of claim 7, further comprising:

generating, by the device, a fingerprint for an audio segment of the plurality of audio segments; and using, by the device, an algorithm to match the fingerprint to a data record in an audio library.

* * * * *